June 11, 1935. G. MUFFLY 2,004,582
MECHANISM FOR DISINTEGRATING FROZEN LIQUID
Filed May 23, 1931
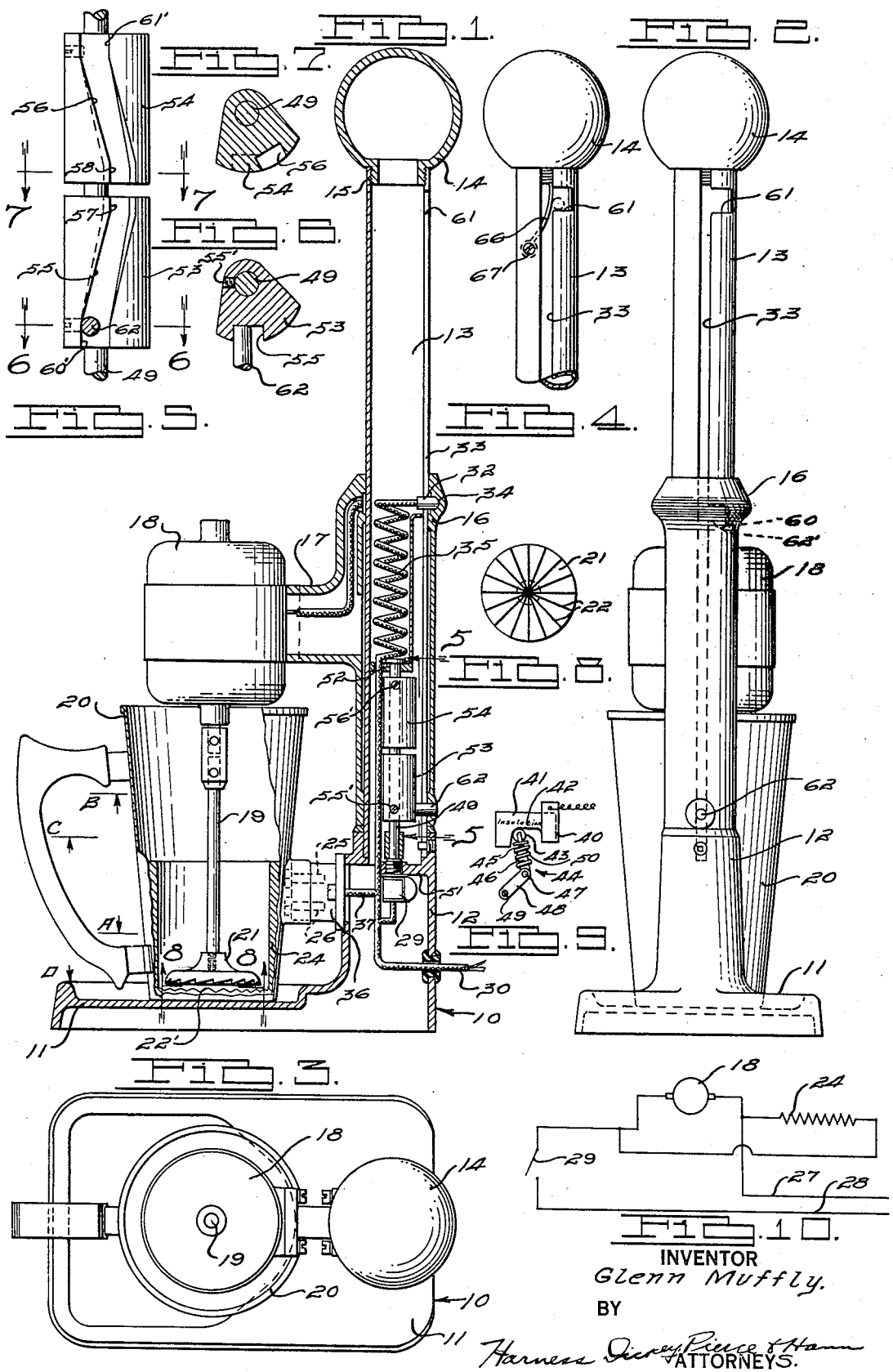
INVENTOR
Glenn Muffly.
BY
Harness Dickey Pierce & Hann
ATTORNEYS.

Patented June 11, 1935

2,004,582

UNITED STATES PATENT OFFICE 2,004,582

MECHANISM FOR DISINTEGRATING FROZEN LIQUID

Glenn Muffly, Richmond, Mich.

Application May 23, 1931, Serial No. 539,437

11 Claims. (Cl. 259—1)

The invention relates to the manufacture of liquid refreshments and it has particular relation to a method of and mechanism for disintegrating frozen liquids.

The principal objects of the invention are to provide a mechanism for quickly reducing a block of ice or frozen liquid, to liquid form; to provide a mechanism for quickly disintegrating a drink which initially is prepared in frozen form; to provide a mechanism of the above designated character especially adapted to disintegrate blocks of frozen fruit juices or the like, the liquefying of which ordinarily would require considerable time if effected only by the slow process of melting; to provide a mechanism for disintegrating a frozen liquid in which the latter is subjected to heat while at the same time it is disintegrated by mechanical means; and to provide a method of disintegrating frozen material, whereby the material may be reduced to liquid or semi-liquid form and to provide a method of so disintegrating frozen material into drinkable form that the temperature of the material may be substantially predetermined.

For an understanding of the invention reference may be had to the accompanying drawing, wherein:

Figure 1 is a vertical cross-sectional side view of an ice disintegrating mechanism constructed according to one form of the invention;

Figure 2 is a rear elevational view of the mechanism taken from the right side of Figure 1;

Figure 3 is a plan view of the construction shown by Figure 1;

Figure 4 is a fragmentary view of the standard shown by Figure 1, illustrating a modified form of the invention;

Figure 5 is a detail view on a larger scale taken substantially along the line 5—5 of Figure 1;

Figure 6 is a cross-sectional view taken substantially along the line 6—6 of Figure 5;

Figure 7 is a cross-sectional view taken substantially along line 7—7 of Figure 5;

Figure 8 is a view taken substantially along line 8—8 of Figure 1;

Figure 9 is a bottom view of a circuit breaker employed in the construction shown by Figure 1;

Figure 10 is a diagrammatic view of an electrical circuit which is used for controlling electrical parts of the apparatus shown by Figure 1.

The preparation of liquid refreshments by mixing fruit juices with water and ice is well known. Now it is proposed to freeze fruit juices, and then disintegrate the frozen liquid when it is desired to prepare the drink for consumption. This will permit the manufacturers of fruit juices and other flavorings for drinks, to prepare them in frozen form and retail the mixture in this manner. Then in preparing a drink it will only be necessary to take a cube or other form of block of the frozen liquid and disintegrate it in such a manner as to effect an ice cold drink preferably without the presence of any large lumps of frozen material therein. The applicant's invention is especially concerned with the disintegrating of a block of this frozen liquid which will facilitate preparation of the drink and avoid the long delay that ordinarily would be required in allowing the frozen mixture to be melted solely by the absorption of heat in the ordinary way. It is desired to explain that the term disintegrate is used to define a melting of the frozen liquid, or a breaking up of the frozen liquid into small particles or a combination of melting of and breaking up of the frozen liquid. In the general sense the term is used, it means to convert the frozen liquid into liquid or semi-liquid form.

Referring to Figures 1 and 2, a support 10 is provided which comprises a base 11 having an upwardly projecting hollow portion 12, to the upper end of which a tubular standard 13 is secured. Where desired, the upper end of the tubular standard 13 may be closed by means of a ball 14 screw threaded as indicated at 15, into the upper end of the standard. A hollow housing 16 slidably mounted for vertical movement on the standard 13 is provided with a hollow offset portion 17 which is rigidly secured to the housing of a motor 18 disposed above the base 11. The motor 18 is provided with a vertically disposed shaft 19 which is adapted to project into a container 20 removably supported on the base 11. At its lower end the shaft 19 is provided with a disc or head 21 for disintegrating frozen liquids which may be disposed in the container 20 in the form of a cube, cylinder, or block of other suitable shape.

The head 21 is provided with teeth 22 similar to those provided on end milling cutters although other forms of teeth may be used or the teeth may be omitted altogether. Also instead of providing the head 21 with teeth, radial or other ribs 22' may be formed on the bottom surface of the container for engaging the frozen liquid, or ribs may be formed on both the head and surface of the container. Also the surface of the head and likewise the surface of the container may be plain or free from any teeth or protuberances.

Disintegration of the frozen liquid is effected by rotation of the head 21 and simultaneously applied pressure of the head on the frozen material.

This pressure is caused by the weight of the housing 16 and motor 18, since they are movable downwardly on the standard 13 in a free manner. Teeth on the head or container or both, for shaving the ice may assist in disintegrating the material, but a plain head or container surface is satisfactory owing to the pressure of the head against the ice.

For accelerating the disintegrating operation, the lower part of the container 20 is provided with a conventional type of heating element 24 which is employed for the purpose of heating the contents of the container. The construction of the heating element need not be described in detail, but ordinarily it includes two terminals indicated at 25 and 26 which are adapted to engage an ordinary type of plug used in an electrical circuit. The heating element 24 and electric motor 18 may be connected with a source of electrical supply as shown by Figure 10. The lead-in terminals in the circuit are indicated at 27 and 28 and it is apparent that the motor and heating element 24 are arranged in parallel and that the conductor 28 includes a circuit breaker 29 which may be used for de-energizing and energizing the motor and heating element simultaneously. The conductors 27 and 28 are associated in a single cable and this cable indicated at 30, extends through the lower part of the projection 12 on the base 11, and then upwardly through the tubular standard 13. At its upper end the cable extends through a tube 32 secured to the housing 16, and which projects through a longitudinally extending slot 33 formed in the tubular standard. This tube extends circumferentially about the standard and is anchored in a groove 34 formed on the inner peripheral surface of the housing 16. Then the cable extends through the offset portion 17 of the housing 16 and is connected to the motor 18. An intermediate portion of the cable in the standard is helically arranged as indicated at 35 for the purpose of permitting an operative elongation of the cable when the housing 16 is moved vertically on the standard 13. A plug 36 secured to the upwardly projecting portion 12 of the base 11 and connected to a portion of the cable 30 indicated at 37 is adapted to electrically connect the terminals 25 and 26 of the heating element.

The switch 29 particularly shown by Figure 9, comprises two metallic plates, only one of which is shown as indicated at 40, which are disposed on opposite sides of an insulating plate 41. One edge portion of the insulating plate 41 has an arcuate edge or recess 42 and a metallic roller 43 forming part of a switch actuating element 44 is adapted to roll along the arcuate edge and contact with the plates 40 for completing the circuit. The roller is mounted on one end of a short rod 45 which telescopes slightly into a sleeve 46 connected at its opposite end by means of a pin 47, to an arm 48 rigidly mounted on a shaft 49. A helical spring 50 encircling the rod 45 and sleeve 46 and disposed between collars on said members, normally urges the roller 43 against the edge of the insulating plate. When the shaft 49 is turned counter clockwise as shown by Figure 9 it is apparent that at one point in this movement the roller and pivot pin 47 and shaft 49 will be aligned, and that a continued movement will cause the roller 43 to move out of alignment on the other side whereupon the spring 50 will urge the roller 43 against the metallic plates 40. In other words, the spring 50 retains the roller either in the position shown by Figure 9, or in contacting relation with the plates 40.

Referring to Figure 1, the shaft 49 of the switch operating mechanism extends through a horizontal wall 51 projecting interiorly of the portion 12 of the base 11, and at its upper end it is journaled in a similar wall 52 secured to the inner surface of the standard 13. Cam elements 53 and 54 are secured to intermediate portions of the shaft 49 by means of screws 55' and 56' in such manner that the members may be adjusted with respect to each other and to the shaft for varying operation of the switch and hence operative and inoperative periods of the motor and heating element.

As best shown by Figure 5 and Figure 7 the cam members 53 and 54 are provided with cam grooves 55 and 56 respectively which have corresponding vertical end portions 57 and 58 at their adjacent ends. At opposite sides of the vertical portion 57 and 58 the grooves 55 and 56 extend at a slightly oblique angle to the vertical portions 60' and 61'. A cam pin 62 secured to the lower end of the housing 16, projects through the slot 33 in the tubular standard 13, and is adapted to move in the cam grooves 55 and 56.

Assuming that the parts are in their positions as shown by Figure 1, the pin 62 on the housing 16 is located in the cam groove 55 in the member 53 as shown by Figure 5. The switch then is in its inoperative position and consequently the motor and heating element 24 are not energized. Upon moving the motor and housing 16 upwardly the pin 62 engages the left side wall of cam groove 55 as shown in Figure 5, and gradually turns the member 53 and shaft 49 and until the switch is thrown into its operative position. This causes the motor to be energized which is desired during the upward movement of the motor for the purpose of drying the disc 21 after it has been associated with the material in the bottom of the container 20. Further movement of the housing 16 and pin 62 causes the pin to engage the right side wall of groove 56 in the member 54 and finally causes the switch to be thrown into its inoperative position. The housing 16 then may be moved further upward until it is free from engagement with the cam member 54, and for the purpose of retaining the housing in an upper inoperative position, the tubular standard 13 is provided with slots 60 and 61 adapted respectively to receive the pin 62 and the tube 32. It is apparent that when the housing has moved upward a certain distance it may be turned slightly until the pin 62 engages the slot 60 and the sleeve 32 engages the slot 61 and for preventing accidental movement of the housing after the pin and sleeve have so been associated with the slots, slot 60 is enlarged to provide a notch 62' in which the pin 62 will be retained. It may be desirable to use some resilient means for so turning the housing when it reaches its upper limit, and for this purpose a resilient spring like element 66 may be secured by means of a screw 67, to the inner surface of the tubular standard 13. This normally has an end portion disposed in alignment with slot 33. Then when the tube 32 reaches its upper and substantially limited position, the spring 66 automatically moves it into the slot 61. A spring of this character also may be used in conjunction with the pin 62 instead of with the tube 32, or it may be used in conjunction with both members.

When the housing 16 is allowed to move downward by gravity, the pin 62 will move into the upper end of the cam groove 56 in member 54 and close the switch, thus energizing the motor 18 and the heating element 24. These parts will be energized until the pin 62 reaches substantially its lowermost position and then the switch will be moved into its inoperative position de-energizing the motor and heating element. The cam grooves and pin 62 are so constructed and associated, that the motor 18 and heating element 24 will be energized during an upward movement of the disc 21 between the horizontal lines A and B. During a gravitational movement of the motor and housing downwardly the motor and heating element will be energized during a movement of the disc 21 between the horizontal lines C and D. It is to be noted that the disc 21 ceases rotary movement slightly before it can engage the bottom of the container 20 and damage it, and consequently the frozen liquid in the container may be almost completely disintegrated by the disc. Also, the heating element is then de-energized which prevents undesirable heating of the material in the container. The cam grooves of course can be changed in shape as found desirable, for the purpose of closing and opening the switch at preferred times.

In operating the mechanism, a block of the frozen liquid, which may be of frusto-conical or any other suitable shape, is deposited in the container 20 and then the housing 16 and the motor 18 are allowed to move downwardly by means of gravity. The head or disc 21 engages the upper surface of the frozen material and gradually disintegrates it because of frictional and pressure contact therewith, which, combined with heat produced by heating element 24, naturally raise the temperature of the material. In other words, the heat and the rapidly rotating disc, pressing against the ice, cause a rapid melting of the latter, which may be accompanied by a breaking, or shaving of the ice. Upon completion of the disintegrating operation the disc 21 stops rotating in proximity to the bottom of the container 20 and the heating element is de-energized. When the housing 16 and motor 18 are moved upwardly the disc 21 is rotated during an interval of this movement for the purpose of drying it and then the housing 16 is moved upwardly in its inoperative position where it is retained by means of the slots 60 and 61. If desired, the upward movement of the housing 16 may be halted in the on position of the switch 29 for the further melting, mixing and heating of the material in container 20.

Preferably the heat imparted to the frozen material is approximately equal to the latent heat of fusion of the material although this may be varied by varying the heating element or its position or the time that it acts upon the material. Adjustability of the cam elements 53 and 54 on shaft 49 serves as a means for altering the operating of both the heating element and motor, although various arrangements might be used whereby the heating element is energized for a period of time different from that during which the motor is energized. By means of the invention, a liquid or semi-liquid drink may be prepared by disintegrating frozen material and the temperature therefore predetermined substantially and varied if desired.

It will be understood that the frozen material preferably is agitated during disintegration thereof, and this results in a substantially uniform application of heat to the material. Hence it is easier to secure a final substantially predetermined temperature, which may substantially correspond to the freezing point of the material. It is also apparent that the fluidity of the material governs the time the heating element and motor are energized. For example, if more heat is necessary to reduce the frozen material to drinkable form it will change to a fluid more slowly and hence heat will be imparted thereto for a longer period of time.

Although only certain forms of the invention have been illustrated and described in detail it will be apparent to those skilled in the art that various modifications may be made without departing from the scope of the claims.

I claim:

1. An apparatus for preparing cold drinks from frozen material comprising means for heating the material, means for mechanically agitating it while it is heated, and automatic means for controlling one of the above mentioned means when a predetermined degree of fluidity is obtained and depending upon said degree of fluidity.

2. In a cold drink preparing apparatus, a receptacle for frozen material, electrical heating means arranged to supply the heat of fusion to the material, power actuated means for mixing the material as it melts, and automatic means regulated by the liquefaction of the material for stopping the application of heat to the material.

3. A mechanism for disintegrating frozen liquids comprising a standard, a container support and a container, a motor on the standard having a shaft provided with a disintegrating device, said motor and container support being relatively movable, means for automatically energizing the motor as the disintegrating device moves into the container and de-energizing the motor when the device reaches a point in proximity to the bottom of the container, and means for automatically energizing the motor as the disintegrating device is retracted from the container and for de-energizing the motor as the retraction of the device is continued.

4. An apparatus for preparing cold drinks from frozen material comprising means for heating the material, means for mechanically agitating it while it is heated, and means responsive to the fluidity of the material for rendering the first pair of means inoperative.

5. A mechanism for disintegrating frozen liquids comprising a container for the frozen liquid, rotatable means adapted to move into the container and engage the frozen material, means for constantly urging the rotatable means and the material against each other to cause melting of the latter as a consequence of pressure and rotation of the rotatable means, auxiliary means for heating the material during disintegration thereof, and automatic means for stopping rotation of the rotatable means after a predetermined movement of the latter into the container.

6. A mechanism for disintegrating blocks of frozen liquid having a solidity substantially the same as that of ice, comprising a standard, a container and a support for the container, a motor on the standard having a shaft provided with a disintegrating device, said motor and container supports being relatively movable longitudinally of the shaft, and automatic means for energizing and maintaining the motor energized only during a predetermined portion of the movement of the motor and support relatively and depending upon the degree of fluidity obtained with respect to the frozen liquid engaged by said disintegrating device.

7. A mechanism for disintegrating blocks of frozen liquids having a solidity substantially the same as that of ice, comprising a standard, a container and a support for the container, a motor on the standard having a shaft provided with a disintegrating device adapted to abuttingly engage a block of the frozen liquid deposited in the container, said motor and container support being relatively movable longitudinally of the shaft, means normally urging the disintegrating device into engagement with the block of frozen liquid, and means for automatically deenergizing the motor after a predetermined movement of the disintegrating device into the container and a predetermined disintegration of the block of frozen liquid.

8. A mechanism for disintegrating blocks of frozen liquid having a solidity substantially the same as that of ice, comprising a container for the block, rotatable means adapted to move into the container and including disintegrating means adapted to engage the block, means for constantly urging the disintegrating means into the container into engagement with the block of frozen liquid, so as to cause melting of the latter as a consequence of pressure and rotation of the rotatable means, auxiliary means for heating the frozen liquid during disintegration thereof and automatic means for stopping rotation of the rotatable means depending upon a degree of disintegration and fluidity obtained with respect to the frozen liquid.

9. A mechanism for disintegrating frozen liquids comprising a container for the frozen liquid, means for heating the container, rotatable means adapted to move downwardly relative to and into the container for engaging the frozen liquid, and automatic means for stopping the application of heat by the first mentioned means at a fixed point in the downward movement of the rotatable means.

10. A mechanism for disintegrating frozen liquids comprising a container for the frozen liquid, means for heating the container, rotatable means adapted to move into the container and engage the frozen material, means for constantly urging the rotatable means and the material against each other, and automatic means for stopping the application of heat upon a predetermined movement of the rotatable means into the container.

11. A mechanism for disintegrating frozen liquids comprising a container for the frozen liquid, agitator means adapted to move into the container and engage the frozen material, means for heating the material, and automatic means for stopping the application of heat to the material after a predetermined movement of the agitator means into the container.

GLENN MUFFLY.